(12) United States Patent
Moore et al.

(10) Patent No.: US 8,151,267 B2
(45) Date of Patent: Apr. 3, 2012

(54) PRINTING SYSTEM SCHEDULER METHODS AND SYSTEMS

(75) Inventors: Steven Robert Moore, Pittsford, NY (US); Barry Paul Mandel, Fairport, NY (US); Saurabh Prabhat, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1030 days.

(21) Appl. No.: 12/099,466

(22) Filed: Apr. 8, 2008

(65) Prior Publication Data

US 2009/0254910 A1 Oct. 8, 2009

(51) Int. Cl.
G06F 19/00 (2011.01)
G06F 17/10 (2006.01)
(52) U.S. Cl. .................................... 718/102; 718/103
(58) Field of Classification Search .................. None
See application file for complete search history.

(56) References Cited

U.S. PATENT DOCUMENTS

| | | |
|---|---|---|
| 5,287,194 A | 2/1994 | Lobiondo |
| 5,363,175 A | 11/1994 | Matysek |
| 5,668,942 A | 9/1997 | Fromherz |
| 5,696,893 A | 12/1997 | Fromherz et al. |
| 5,710,635 A | 1/1998 | Webster et al. |
| 5,729,790 A | 3/1998 | Conley et al. |
| 5,771,339 A | 6/1998 | Fromherz |
| 5,781,710 A | 7/1998 | Fromherz et al. |
| 7,070,250 B2 * | 7/2006 | Lester et al. ...................... 347/4 |
| 7,197,577 B2 * | 3/2007 | Nellitheertha ..................... 710/6 |
| 7,206,843 B1 * | 4/2007 | Allavarpu et al. ............ 709/226 |
| 7,219,347 B1 * | 5/2007 | Waddington .................. 718/104 |
| 7,372,589 B2 * | 5/2008 | Ohara ......................... 358/1.15 |
| 7,457,886 B1 * | 11/2008 | Smith ............................. 710/6 |
| 7,684,066 B2 * | 3/2010 | Shirai ......................... 358/1.14 |
| 7,689,311 B2 * | 3/2010 | Ruml et al. .................... 700/103 |
| 2004/0085561 A1 | 5/2004 | Fromherz |
| 2004/0085562 A1 | 5/2004 | Fromherz |
| 2004/0088207 A1 | 5/2004 | Fromherz |
| 2005/0200883 A1 * | 9/2005 | Mannion ...................... 358/1.15 |
| 2006/0106931 A1 * | 5/2006 | Richoux ....................... 709/226 |

* cited by examiner

*Primary Examiner* — Eric Coleman
(74) *Attorney, Agent, or Firm* — Fay Sharpe LLP (57) ABSTRACT

Provided are printing system scheduler methods and systems. Specifically, a shadow scheduler is disclosed which provides alternative modular printing system configurations to execute one or more print jobs, relative to a base modular printing system configuration. According to one exemplary method, a primary scheduler metric value and a shadow scheduler metric value are compared before executing the one or more print jobs.

22 Claims, 6 Drawing Sheets

PRINTING SYSTEM SCHEDULER METHODS AND SYSTEMS

BACKGROUND

This disclosure relates to printing systems. Specifically, this disclosure and embodiments described herein relate to printing system scheduler/planner methods and systems.

Full scale and entry level production printing systems are increasingly being designed and constructed in a modular fashion for an expanding array of applications. One benefit associated with modular printing systems is they can be modified by adding modules and exchanging modules with different capabilities. These modules can include sheet feeding modules, sheet finishing modules, printing modules, fuser modules, etc.

Modular printing systems enable an end user, i.e. customer, to tailor their printing system to meet their current and predicted future requirements. However, because the end user is not always aware of alternative configurations for their existing printing system, and how a specific alternative configuration compares to their existing printing system, many times a representative or other technical person must perform an evaluation to make the necessary comparisons.

This disclosure provides methods and systems to evaluate a current modular printing system and compare performance criteria associated with the current system to one or more alternative modular printing systems.

INCORPORATION BY REFERENCE

U.S. Pat. No. 5,287,194 issued to Lobiondo on Feb. 15, 1994, entitled "DISTRIBUTED PRINTING";

U.S. Pat. No. 5,363,175 issued to Matysek on Nov. 8, 1994, entitled "DISTRIBUTED JOB SCHEDULING WITH MODULAR COMPONENTS"; and U.S. Pat. No. 5,781,710 issued to Fromherz et al. on Jul. 14, 1998, entitled "GENERIC METHOD FOR SCHEDULING PRINT ENGINES USING PRINT ENGINE CAPABILITIES" all of which are totally incorporated herein by reference.

BRIEF DESCRIPTION

According to one aspect of this disclosure, a method of providing one or more alternative modular printing system configurations is disclosed. The alternative modular printing system configurations are relative to an actual modular printing system configuration including a primary scheduler for one or more printing jobs and a shadow scheduler for the one or more printing jobs, the method comprising a) receiving data representing the one or more printing jobs and communicating the data to the primary scheduler and the shadow scheduler; b) the primary scheduler, scheduling the execution of the one or more print jobs by identifying a set of printing system module capabilities associated with the actual modular printing system configuration capable of executing the one or more printing jobs, and determining a sequence of operations associated with the actual modular printing system configuration capable of executing the one or more printing jobs; c) determining a metric value associated with the execution of the one or more print jobs for the actual modular printing system configuration; d) the shadow scheduler, scheduling the execution of the one or more print jobs by identifying a set of printing system module capabilities associated with the alternative modular printing system configuration capable of executing the one or more printing jobs, determining a sequence of operations associated with the alternative modular printing system configuration capable of executing the one or more print jobs, and determining the metric value associated with the execution of the one or more print jobs for the alternative modular printing system configuration; e) performing a comparison of the metric value associated with the execution of the one or more print jobs for the actual modular printing system configuration relative to the metric value associated with the execution of the one or more print jobs for the alternative modular printing system configuration; f) producing comparison results; and g) communicating the comparison results to a data receiving device.

According to another aspect of this disclosure, a computer program product is disclosed. The computer program product comprises a computer usable data carrier storing instructions that, when executed by a computer, cause the computer to perform a method of providing one or more alternative modular printing system configurations relative to an actual modular printing system configuration, the method comprising a) receiving data representing one or more printing jobs; b) a primary scheduler program, scheduling the execution of the one or more print jobs by identifying a set of printing system module capabilities associated with the actual modular printing system configuration capable of executing the one or more printing jobs, and determining a sequence of operations associated with the actual modular printing system configuration capable of executing the one or more printing jobs; c) determining a metric value associated with the execution of the one or more print jobs for the actual modular printing system configuration; d) a shadow scheduler, scheduling the execution of the one or more print jobs by identifying a set of printing system module capabilities associated with the alternative modular printing system configuration capable of executing the one or more printing jobs, determining a sequence of operations associated with the alternative modular printing system configuration capable of executing the one or more print jobs, and determining the metric value associated with the execution of the one or more print jobs for the alternative modular printing system configuration; e) performing a comparison of the metric value associated with the execution of the one or more print jobs for the actual modular printing system configuration relative to the metric value associated with the execution of the one or more print jobs for the alternative modular printing system configuration; f) producing comparison results; and g) communicating the comparison results to a data receiving device.

According to another aspect of this disclosure, a modular printing system is disclosed. The modular printing system comprises one or more printing modules; one or more sheet feeder modules operatively connected to the one or more printing modules; one or more sheet output modules operatively connected to the one or more printing modules; and one or more controllers operatively connected to the one or more printing modules, the one or more controllers comprising a primary scheduler and a secondary scheduler, the one or more controllers configured to a) receive data representing one or more printing jobs and communicate the data to the primary scheduler and the shadow scheduler; b) the primary scheduler configured to schedule the execution of the one or more print jobs by identifying a set of printing system module capabilities associated with the modular printing system capable of executing the one or more print jobs, and determine a sequence of operations associated with the modular printing system for executing the one or more print jobs; c) determine a metric value associated with the execution of the one or more print jobs for the modular printing system; d) the shadow scheduler, schedule the execution of the one or more print jobs by identifying a set of printing system module capabilities associated with an alternative modular printing system capable of executing the one or more print jobs, and determine the metric value associated with the execution of the one or more print jobs for the alternative modular printing system; e) perform a comparison of the metric value associated with the execution of the one or more print jobs for the modular printing system, relative to the metric value associated with the execution of the one or more print jobs for the alternative modular printing system; f) produce comparison results; and g) communicate the comparison results to a data receiving device.

DETAILED DESCRIPTION

This disclosure, and the exemplary embodiments disclosed, provides printing system methods and systems for determining alternative modular printing system configurations, relative to an actual or existing modular printing system configuration.

The methods and systems provided use a shadow planner/scheduler, which is also referred to as a shadow scheduler for purposes of this disclosure. The function of the shadow planner is to continuously or selectively evaluate alternative printing system configurations for the actual modular printing system configuration. During this so-called evaluation, the performance of the existing/actual printing system is compared to the performance of the alternative printing system configurations. This comparison provides a basis for a user of the existing printing system to determine if reconfiguring the existing print system to replicate one of the alternative modular printing system configurations is advantageous from a productivity, run-cost, reliability, and/or quality perspective.

Substantively, the exemplary methods and systems disclosed operate where a primary scheduler is responsible to process an incoming job stream and to establish itineraries for each successive sheet. Normally, the primary scheduler does so in real-time while typically trying to minimize the time to complete each sheet, i.e. to print, fuse, finish, stack, etc. In parallel, a shadow scheduler also operates on the job stream in real-time, or optionally, at a predetermined time, e.g. every day, once a month, etc.

According to one exemplary embodiment, a system controller compares instantaneous productivity of the actual modular printing system, relative to the one or more alternative modular printing systems, where the alternative modular printing system productivity is determined by the shadow scheduler. Furthermore, the system controller may report to an end user the cumulative performance of the actual vs. alternative configurations, thereby providing the end user with a basis to determine if an alternative configuration is better suited to their job stream over a specific period of time.

Figure 1:
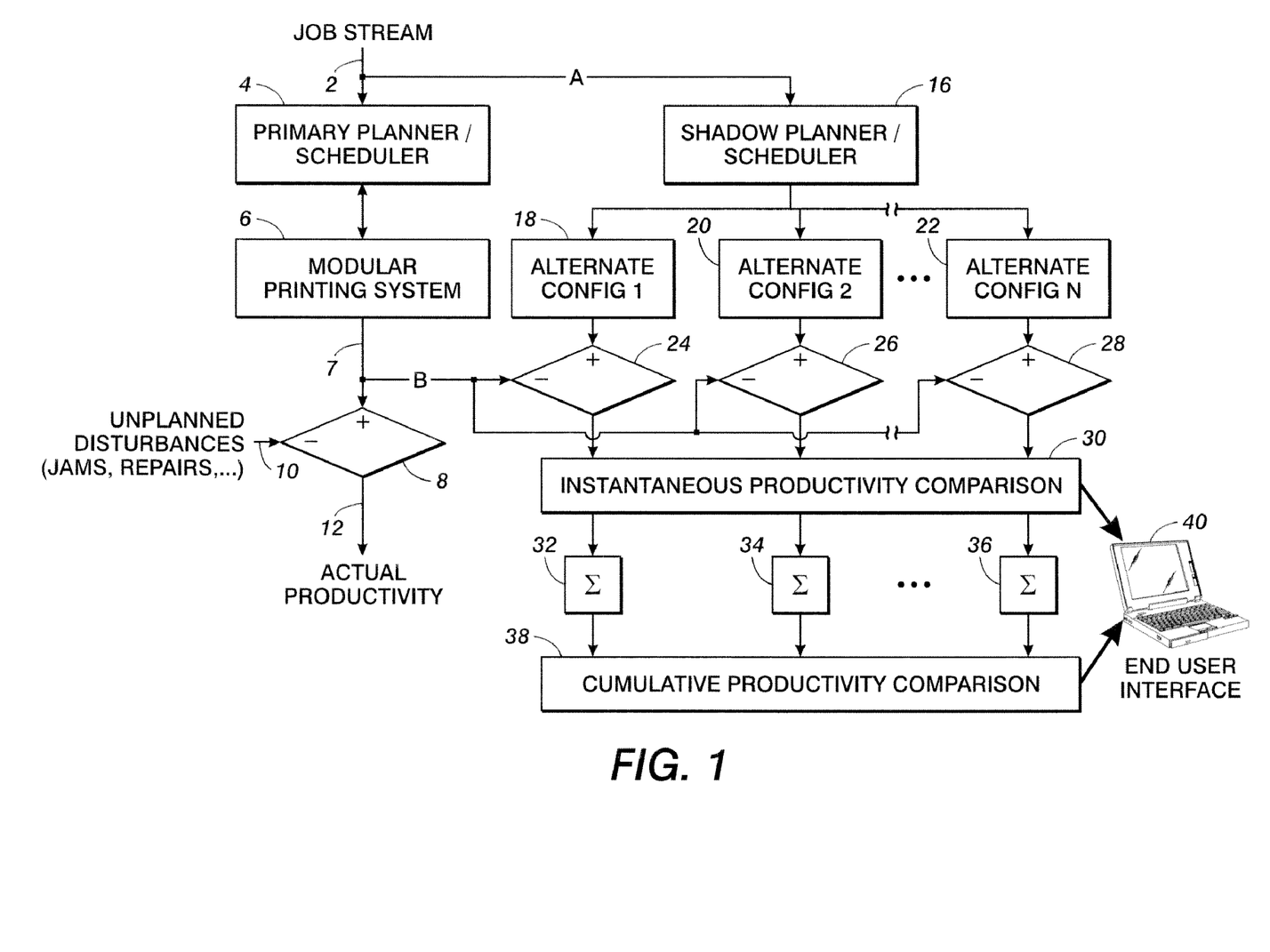
FIG. 1 is a block diagram illustrating an exemplary embodiment of a method and system for providing one or more alternative modular printing system configurations, relative to an actual modular printing system configuration, according to this disclosure.

With reference to FIG. 1, illustrated is a block diagram representing an exemplary method/system for incorporating a shadow scheduler, according to one aspect of this disclosure.

Initially, a job stream is communicated to a primary scheduler 4 and a shadow scheduler via communication line(s) 2. The job stream data communicates information related to one or more print jobs to be completed by the modular printing system 6.

Typical job stream data includes, but is not limited to, media type, media size, special processing instructions, page layout data, image data, etc.

The modular printing system 6, or what is also referred to as an existing modular printing system or actual modular printing system, includes a plurality of printing system modules, for example, but not limited to, operatively connected color marking engines, black and white marking engines, sheet feeder modules, media handling modules, interface modules, fuser modules, finishing modules and/or sheet stacker modules.

After the primary scheduler receives the job stream data, the primary scheduler schedules the execution of the one or more print jobs, i.e. job stream, by identifying a set of printing system module capabilities necessary to execute the print jobs using one or more modules associated with the modular printing system 6. In addition, the primary scheduler 4 determines a sequence of operations to be performed by printing system 6 and initiates the execution of the sequence of operations to complete the print jobs using the modular printing system 6.

One example of a primary scheduler is disclosed in U.S. Pat. No. 5,781,710, issued on Jul. 14, 1998 to Fromherz et al.

The ideal productivity associated with the execution of the print jobs by modular printing system 6 is represented by reference character 7. The actual productivity associated with the execution of the print jobs is represented as reference character 12, where the actual productivity is the difference 8 between the ideal productivity 7 and unplanned disturbances 10 (e.g. paper jams, repairs, etc.).

Running in parallel to the primary scheduler 4, and associated printing system 6, the shadow scheduler receives the identical job stream data received by the primary scheduler and processes a simulated execution of the job stream for one or more alternative modular printing system configurations 18, 20 and 22.

The alternative configurations 18, 20 and 22 can include, but are not limited to, distinct reconfigurations of the actual or existing modular printing system 6 which add one or more printing system modules, remove one or more printing system modules, substitute/replace one or more printing system modules, and enable and/or disable one or more systems associated with one or more modules of the actual printing system 6. Examples of alternative modular printing systems are provided in FIGS. 3-5, relative a base configuration illustrated in FIG. 2, and will be described below.

To perform a simulation of the alternative modular printing system configurations 18, 20, 22, substantively, the shadow planner 16 identifies a set of printing system module capabilities necessary to execute the printing jobs associated with the job stream, determines a sequence of operations associated with each of the alternative configurations 18, 20 and 22, to execute the job stream and determines the productivity associated with each alternative configuration 18, 20 and 22.

Comparators 24, 26 and 28 compare the ideal productivity associated with the actual modular printing system 6 and, respectively, the productivity associated with each alternative modular printing system configuration 18, 20, 22.

Block 30 represents the instantaneous productivity comparisons of the plurality of printing system configurations, blocks 32, 34 and 36 represent an integrator to provide a cumulative productivity comparison 38 for a predetermined or indefinite time period. For example, but not limited to, every hour, day, month, etc.

The comparison results are outputted to a data receiving device, for example, an End User interface 40 such as a laptop computer or display device. Other data receiving devices may include, but are not limited to, data communication devices, data storage devices, a printer, etc.

While the process diagram illustrated in FIG. 1, and described heretofore, is directed to the comparison of the productivities associated with the existing/actual modular printing system configuration, relative to one or more alternative modular printing systems, other metric(s) comparisons associated with the modular printing systems is within the scope of this disclosure. For example, but not limited to, the shadow scheduler can compare productivity as measured by sheets printed per minute, run-costs associated with the job stream(s), reliability associated with the respective printing system configurations, and/or quality of print metrics associated with the respective printing system configurations.

Other exemplary embodiments of the disclosed shadow scheduler methods/systems include a shadow scheduler and primary scheduler integrated within one processor/controller. Moreover, the shadow planner may operate within the same hardware used for the primary scheduler. Alternatively, links A and B illustrated in FIG. 1 can enable a parallel set of hardware or a LAN-connected or remote shadow scheduler process entity. Furthermore, the shadow scheduler can be connected to the existing printing system on a periodic basis.

It is also to be understood, one of the alternative modular printing systems can be the current or existing modular printing system, wherein the existing system is simulated in the same manner as the alternative printing system configurations. If this is done, the link B shown in FIG. 1 is not necessarily required. An advantage of this approach is that any propose/accept/confirm (PAC) protocol breaks or cancels from printing modules, which may occur during actual itinerary planning by the primary scheduler, are filtered out.

With regard to the selection of alternative modular printing system configurations for processing, in addition to programming the shadow scheduler directly, a User Interface will allow a user to specify the alternative configuration(s) to be considered.

As previously described, alternative metrics to productivity can be generated and compared by the shadow scheduler. One example includes reliability, where the shadow planner can perform proactive and/or reactive sensitivity analysis to recommend alternative printing system configurations. To improve the reliability of the existing printing system, the shadow scheduler can evaluate alternative configurations of the existing printing system modules with specific systems enabled and/or disabled, determined by evaluating the failure/shut-down probabilities of the various module systems, i.e. capabilities.

Figure 2:
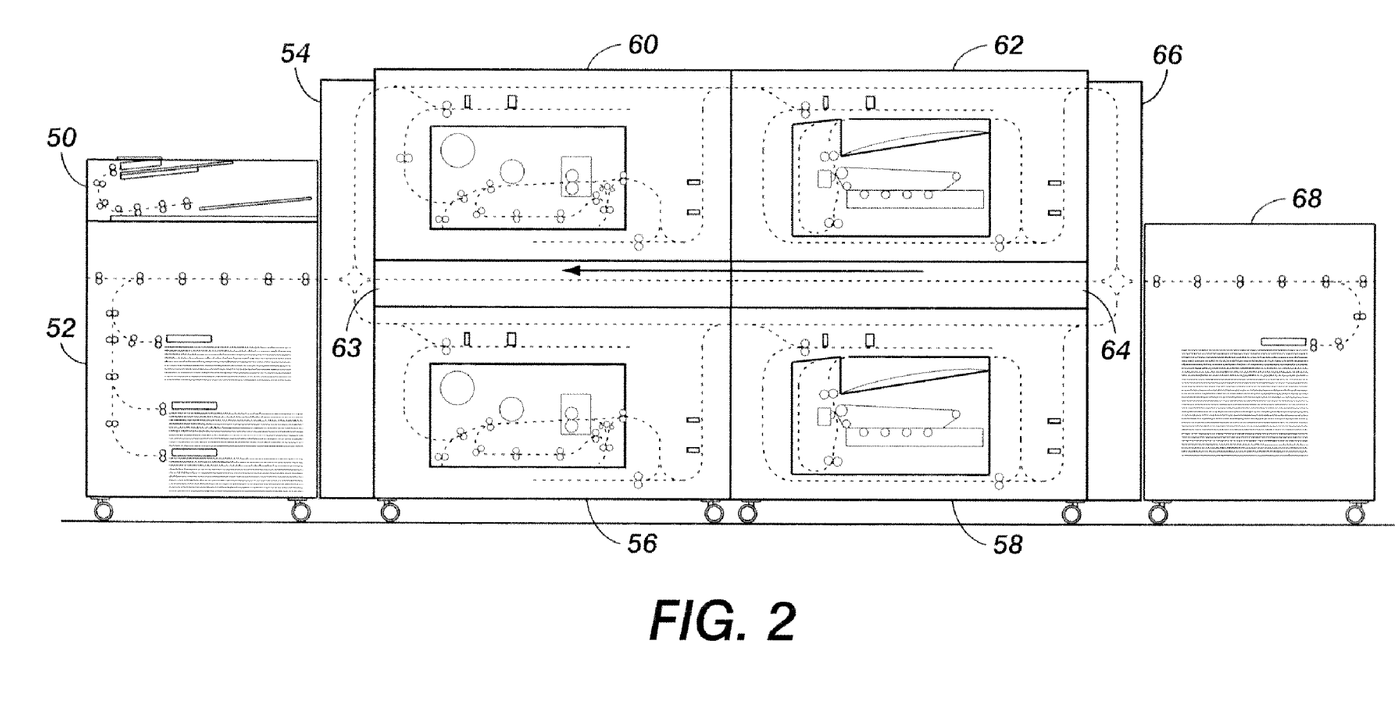
FIG. 2 is a schematical representation of an exemplary modular printing system base configuration, according to this disclosure.
Figure 3:
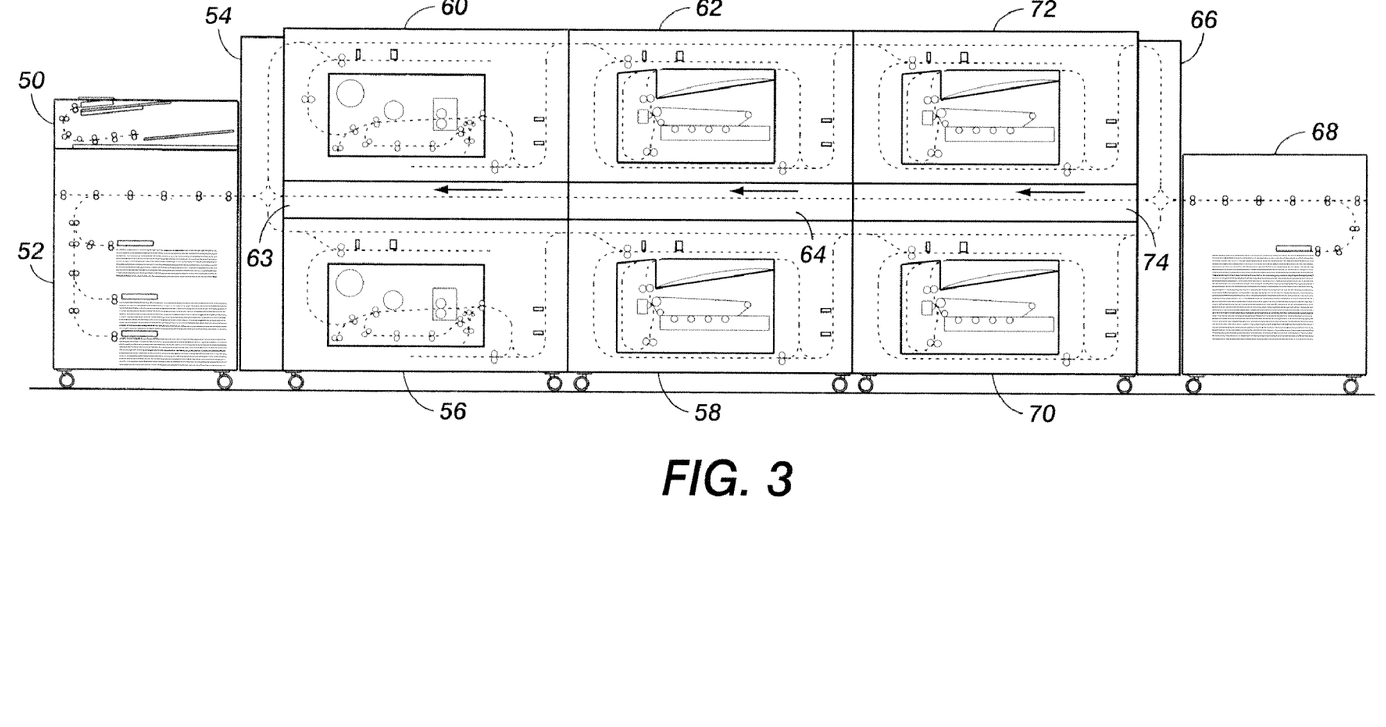
FIG. 3 is an illustration of an exemplary embodiment of a first alternative modular printing system configuration, relative to the base configuration of FIG. 2, according to this disclosure.
Figure 4:
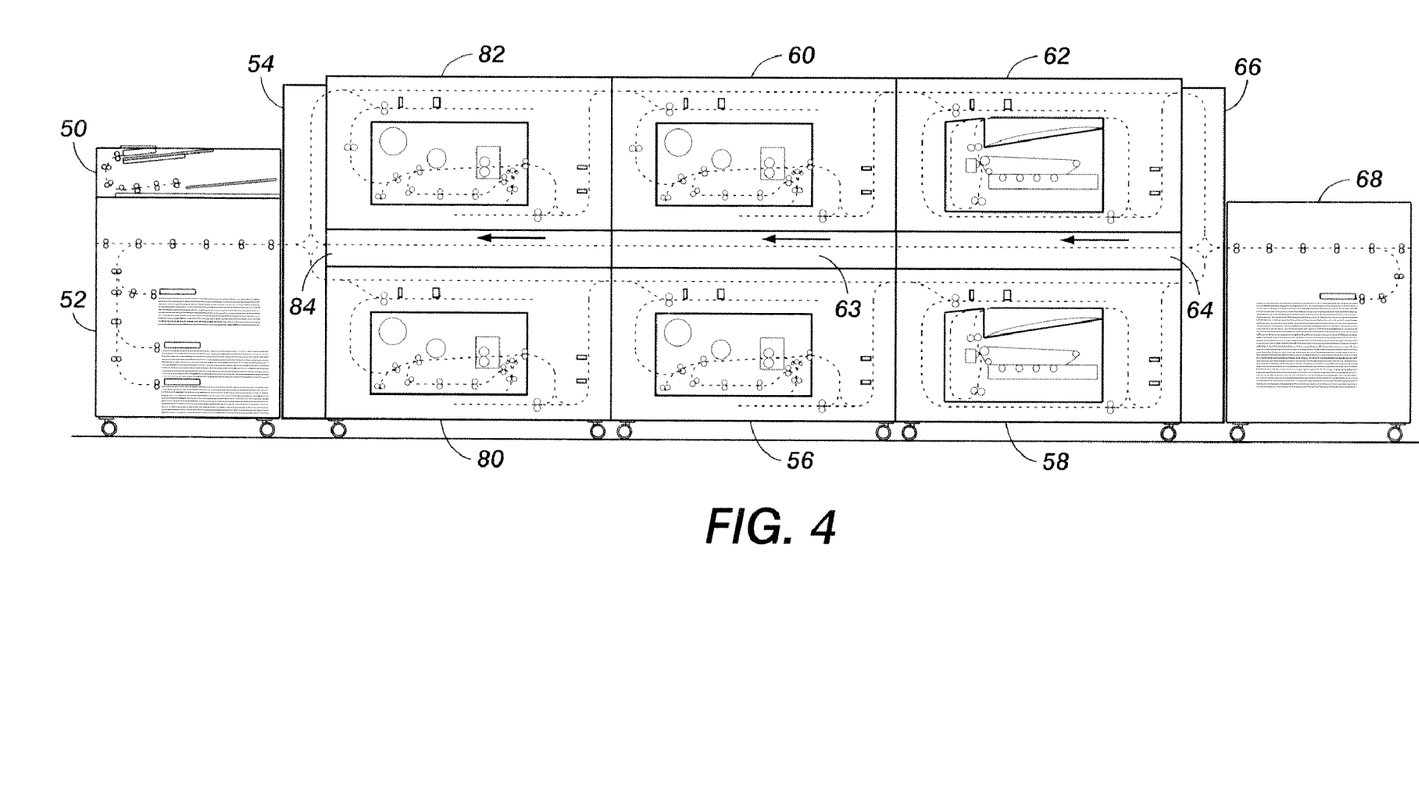
FIG. 4 is an illustration of an exemplary embodiment of a second alternative modular printing system configuration, relative to the base configuration of FIG. 2, according to this disclosure.
Figure 5:
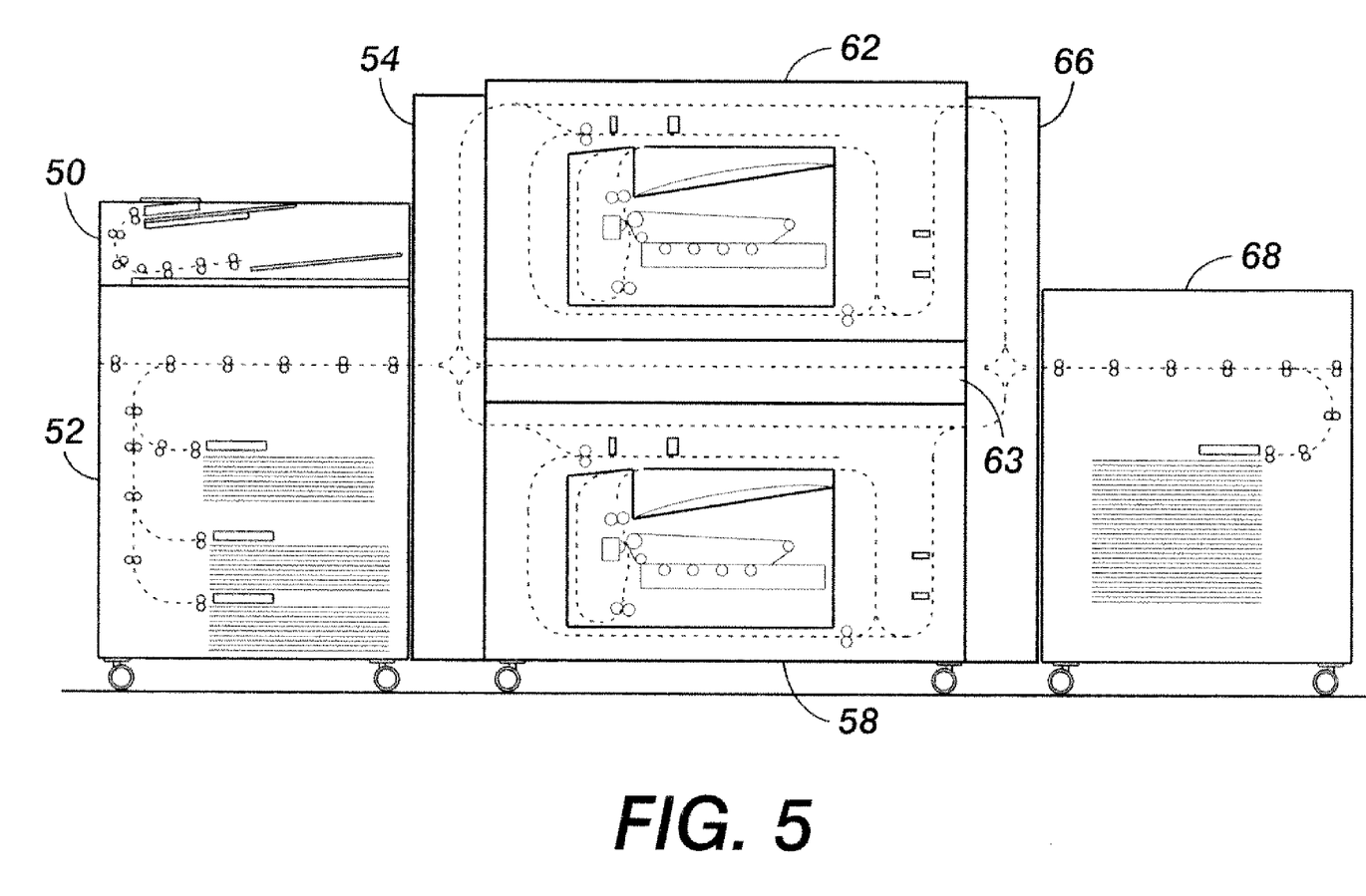
FIG. 5 is an illustration of an exemplary embodiment of a third alternative modular printing system configuration, relative to the base configuration of FIG. 2, according to this disclosure.

With reference to FIG. 2, illustrated is an exemplary embodiment of a base configuration according to this disclosure. This example of an existing/actual modular printing system, represented as modular printing system 6 in FIG. 1, is merely intended to provide one example of a base printing system. Moreover, FIG. 3 illustrates merely one exemplary embodiment of an alternative modular printing system, relative to the base configure shown in FIG. 2. FIG. 4 illustrates a second exemplary embodiment of an alternative modular printing system, relative to the base configuration shown in FIG. 2. FIG. 5 illustrates a third exemplary embodiment of an alternative modular printing system, relative to the base configuration.

With continuing reference to FIG. 2, the base configuration associated with an existing modular printing system includes an image input device 50, a sheet feeder module 52, a first black image marking engine (IME) 56, a second black IME 60, a first Cyan, Magenta, Yellow, Black (CMYK) IME 58, a second CMYK IME 62 and a sheet stacker module 68. In addition, sheet transports 54, 63, 64 and 66 are operatively connected to the respective printing system modules to facilitate media sheet transport.

With reference to FIG. 3, illustrated is an exemplary embodiment of a first alternative modular printing system configuration relative to the base configuration illustrated in FIG. 2. The first alternative configuration includes two additional CMYK IMEs 70 and 72 and sheet transport 74, relative to the base configuration.

With reference to FIG. 4, illustrated is an exemplary embodiment of a second alternative modular printing system configuration relative to the base configuration illustrated in FIG. 2. The second alternative configuration includes two additional black (K) IMEs 80 and 82.

With reference to FIG. 5, illustrated is an exemplary embodiment of a third alternative modular printing system configuration relative to the base configurations illustrated in FIG. 2. The third alternative configurations include two fewer K IMEs. In other words, K IMEs 56 and 60 have been removed from the base configuration.

Figure 6:
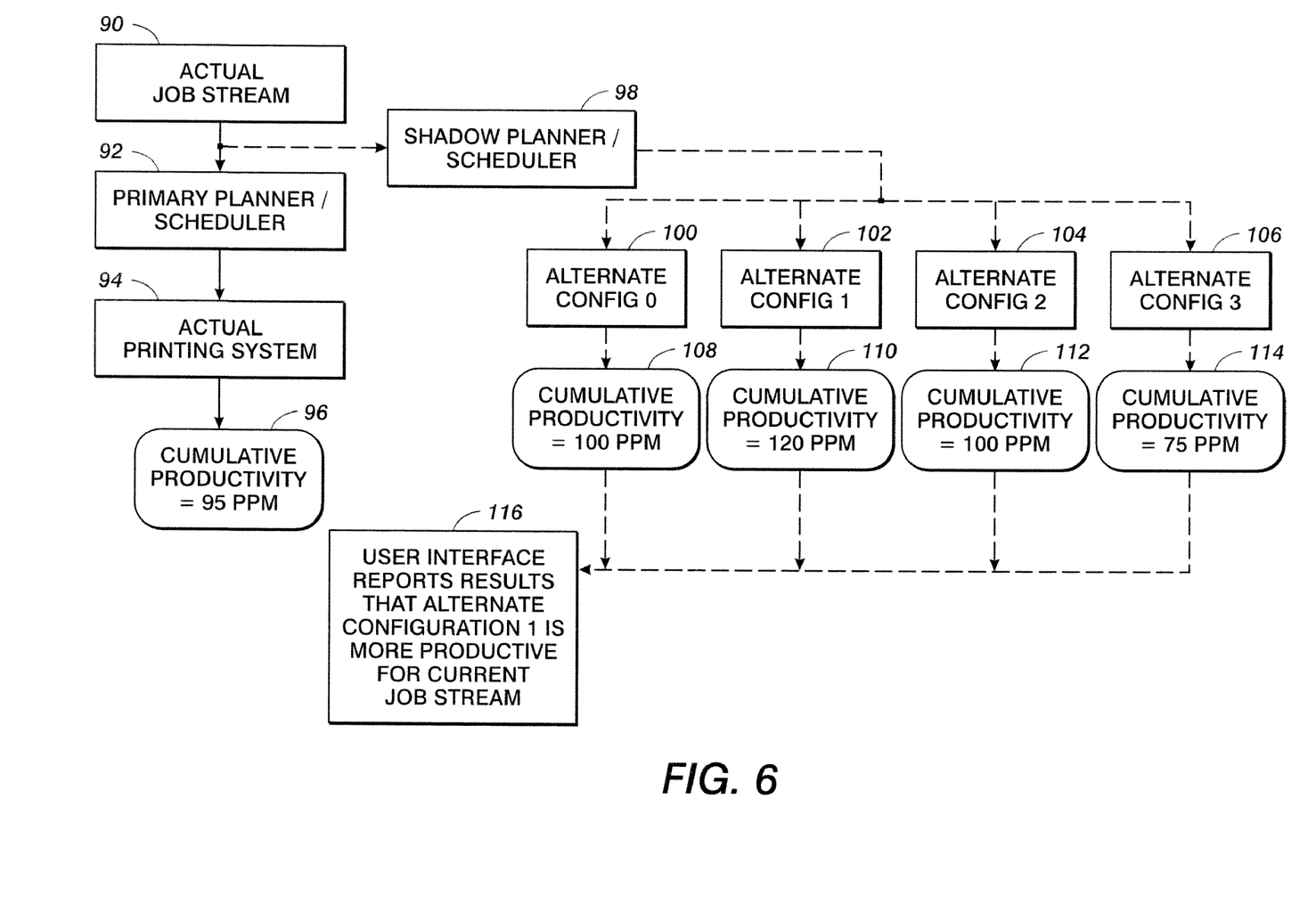
FIG. 6 is an illustration of one exemplary example of the execution of an exemplary method/system to provide alternative modular printing system configurations, according to this disclosure.

With reference to FIG. 6, illustrated is an exemplary example of an exemplary shadow scheduler and associated processes according to this disclosure. The details of the operations were described with reference to FIG. 1 above and will not be repeated.

The process blocks include an actual job stream 90, a primary scheduler 92, an actual modular printing system 94, and a shadow scheduler 98. The shadow scheduler 98, according to this exemplary process example, processes actual job stream data and determines the metric of productivity for alternate modular printing system configurations 0, 1, 2, and 3, which correspond to reference characters 100, 102, 104 and 106, respectively. The cumulative productivity for each alternate configuration is indicated in blocks 108, 110, 112 and 114, while the cumulative productivity for the actual printing system is indicated in block 96.

A User Interface 106 reports results that Alternate Configuration 1 is more productive for the current job stream, relative to the actual printing system and the other alternative configurations. Specifically, the cumulative productivity associated with alternate configuration is 120 ppm, which is greater than the 95 ppm productivity of the actual printing system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of providing one or more alternative modular printing system configurations relative to an actual modular printing system configuration including a primary scheduler for one or more printing jobs and a shadow scheduler for the one or more printing jobs, the method comprising:
   a) receiving data representing the one or more printing jobs and communicating the data to the primary scheduler and the shadow scheduler;
   b) the primary scheduler, scheduling the execution of the one or more print jobs by identifying a set of printing system module capabilities associated with the actual modular printing system configuration capable of executing the one or more printing jobs, and determining a sequence of operations associated with the actual modular printing system configuration capable of executing the one or more printing jobs;
   c) determining a metric value associated with the execution of the one or more print jobs for the actual modular printing system configuration;
   d) the shadow scheduler, scheduling the execution of the one or more print jobs by identifying a set of printing system module capabilities associated with the alternative modular printing system configuration capable of executing the one or more printing jobs, determining a sequence of operations associated with the alternative modular printing system configuration capable of executing the one or more print jobs, and determining the metric value associated with the execution of the one or more print jobs for the alternative modular printing system configuration;
   e) performing a comparison of the metric value associated with the execution of the one or more print jobs for the actual modular printing system configuration relative to the metric value associated with the execution of the one or more print jobs for the alternative modular printing system configuration;
   f) producing comparison results; and
   g) communicating the comparison results to a data receiving device.

2. The method according to claim 1,
   step d) comprising:
      the shadow scheduler, scheduling the execution of the one or more print jobs by identifying a set of printing system module capabilities associated with two or more alternative modular printing system configurations capable of executing the one or more printing jobs, determining respective sequences of operations associated with the two or more alternative modular printing system configurations capable of executing the one or more print jobs, and determining the respective metric values associated with the execution of the one or more print jobs for the two or more alternative modular printing system configurations; and
   step e) comprising:
      performing a comparison of the metric values associated with the execution of the one or more print jobs for actual modular printing system configurations, relative to each respective metric value associated with the execution of the one or more print jobs for the two or more alternative modular printing system configurations.

3. The method according to claim 1, wherein the one or more alternative modular printing system configurations includes, relative to the actual modular printing system configuration, one or more of one or more additional modules, one or more substitute modules, one or more removed modules, one or more enabled systems associated with one or more modules part of the actual modular printing system configuration and one or more disabled systems associated with one or more modules part of the actual modular printing system configuration.

4. The method according to claim 1,
   step b) comprising:
      initiating the sequence of operations to execute the one or more print jobs;
   step c) comprising:
      determining an actual metric value, based on the actual execution of the one or more print jobs, associated with the execution of the one or more print jobs for the actual modular printing system configuration; and
   step e) comprising:
      performing a comparison of the actual metric value associated with the execution of the one or more print jobs for the actual modular printing system configuration relative to the metric value associated with the execution of the one or more print jobs for the alternative modular printing system configuration.

5. The method according to claim 1, wherein the metric value is one or more of productivity, run cost, reliability and quality.

6. The method according to claim 1, wherein the method produces one or both instantaneous comparison results and cumulative comparison results.

7. A method according to claim 1, wherein the data receiving device is one or more of a User Interface Display, a computer, a data communication device, and a data storage device.

8. A computer program product comprising:
   a non-transitory computer readable medium storing instructions that, when executed by a computer, cause the computer to perform a method of providing one or more alternative modular printing system configurations relative to an actual modular printing system configuration, the method comprising:
   a) receiving data representing one or more printing jobs;
   b) a primary scheduler program, scheduling the execution of the one or more print jobs by identifying a set of printing system module capabilities associated with the actual modular printing system configuration capable of executing the one or more printing jobs, and determining a sequence of operations associated with the actual modular printing system configuration capable of executing the one or more printing jobs;
   c) determining a metric value associated with the execution of the one or more print jobs for the actual modular printing system configuration;
   d) a shadow scheduler program, scheduling the execution of the one or more print jobs by identifying a set of printing system module capabilities associated with the alternative modular printing system configuration capable of executing the one or more printing jobs, determining a sequence of operations associated with the alternative modular printing system configuration capable of executing the one or more print jobs, and determining the metric value associated with the execution of the one or more print jobs for the alternative modular printing system configuration;

e) performing a comparison of the metric value associated with the execution of the one or more print jobs for the actual modular printing system configuration relative to the metric value associated with the execution of the one or more print jobs for the alternative modular printing system configuration;

f) producing comparison results; and g) communicating the comparison results to a data receiving device.

9. The computer program product according to claim 8, step d) comprising:

the shadow scheduler program, scheduling the execution of the one or more print jobs by identifying a set of printing system module capabilities associated with two or more alternative modular printing system configurations capable of executing the one or more printing jobs, determining respective sequences of operations associated with the two or more alternative modular printing system configurations capable of executing the one or more print jobs, and determining the respective metric values associated with the execution of the one or more print jobs for the two or more alternative modular printing system configurations; and step e) comprising:

performing a comparison of the metric values associated with the execution of the one or more print jobs for actual modular printing system configurations, relative to each respective metric value associated with the execution of the one or more print jobs for the two or more alternative modular printing system configurations.

10. The computer program product according to claim 8, wherein the one or more alternative modular printing system configurations includes, relative to the actual modular printing system configuration, one or more of one or more additional modules, one or more substitute modules, one or more removed modules, one or more enabled systems associated with one or more modules part of the actual modular printing system configuration and one or more disabled systems associated with one or more modules part of the actual modular printing system configuration.

11. The computer program product according to claim 8, step b) comprising:

initiating the sequence of operations to execute the one or more print jobs;

step c) comprising:

determining an actual metric value, based on the actual execution of the one or more print jobs, associated with the execution of the one or more print jobs for the actual modular printing system configuration; and step e) comprising:

performing a comparison of the actual metric value associated with the execution of the one or more print jobs for the actual modular printing system configuration relative to the metric value associated with the execution of the one or more print jobs for the alternative modular printing system configuration.

12. The computer program product according to claim 8, wherein the metric value is one or more of productivity, run cost, reliability and quality.

13. The computer program product according to claim 8, wherein the method produces one or both instantaneous comparison results and cumulative comparison results.

14. The computer program product according to claim 8, wherein the data receiving device is one or more of a User Interface Display, a computer, a data communication device, and a data storage device.

15. A modular printing system comprising:

one or more printing modules;

one or more sheet feeder modules operatively connected to the one or more printing modules;

one or more sheet output modules operatively connected to the one or more printing modules; and one or more controllers operatively connected to the one or more printing modules, the one or more controllers comprising a primary scheduler and a secondary scheduler, the one or more controllers configured to a) receive data representing one or more printing jobs and communicate the data to the primary scheduler and the shadow scheduler;

b) the primary scheduler configured to schedule the execution of the one or more print jobs by identifying a set of printing system module capabilities associated with the modular printing system capable of executing the one or more print jobs, and determine a sequence of operations associated with the modular printing system for executing the one or more print jobs;

c) determine a metric value associated with the execution of the one or more print jobs for the modular printing system;

d) the shadow scheduler, schedule the execution of the one or more print jobs by identifying a set of printing system module capabilities associated with an alternative modular printing system capable of executing the one or more print jobs, and determine the metric value associated with the execution of the one or more print jobs for the alternative modular printing system;

e) perform a comparison of the metric value associated with the execution of the one or more print jobs for the modular printing system, relative to the metric value associated with the execution of the one or more print jobs for the alternative modular printing system;

f) produce comparison results; and g) communicate the comparison results to a data receiving device.

16. The modular printing system according to claim 15, d) comprising:

the shadow scheduler configured to schedule the execution of the one or more print jobs by identifying a set of printing system module capabilities associated with two or more alternative modular printing systems capable of executing the one or more printing jobs, determine respective sequences of operations associated with the two or more alternative modular printing systems capable of executing the one or more print jobs, and determine the respective metric values associated with the execution of the one or more print jobs for the two or more alternative modular printing system; and e) comprising:

performing a comparison of the metric values associated with the execution of the one or more print jobs for the modular printing system relative to each respective metric value associated with the execution of the one or more print jobs for the two or more alternative modular printing systems.

17. The modular printing system according to claim 15, wherein the one or more alternative modular printing systems includes, relative to the actual modular printing system, one or more of one or more additional modules, one or more substitute modules, one or more removed modules, one or more enabled systems associated with one or more models part of the modular printing system and one or more disabled systems associated with one or more modules part of the modular printing system.

18. The modular printing system according to claim 15,
b) comprising:
the primary scheduler configured to initiate the sequence of operations to execute the one or more print jobs;
c) comprising:
the one or more controllers configured to determine an actual metric value, based on the execution of the one or more print jobs, associated with the execution of the one or more print jobs for the modular printing system; and
e) comprising:
the one or more controllers configured to perform a comparison of the actual metric value associated with the execution of the one or more print jobs for the modular printing system relative to the metric value associated with the execution of the one or more print jobs for the alternative modular printing system.

19. The modular printing system according to claim 15, wherein the metric value is one or more of productivity, run cost, reliability and quality.

20. The modular printing system according to claim 15, wherein the one or more controllers are configured to produce one or both of instantaneous comparison results and cumulative comparison results.

21. The modular printing system according to claim 15, wherein the data receiving device is one or more of a User Interface Display, a computer, a data communication device, and a data storage device.

22. The modular printing system according to claim 15, wherein the one or more printing modules are xerographic printing modules.

* * * * *